(12) United States Patent
Ravindranath et al.

(10) Patent No.: US 8,180,991 B2
(45) Date of Patent: May 15, 2012

(54) ADAPTIVE MEMORY ALLOCATION

(75) Inventors: Sanjeeth Kumar Ravindranath, Bangalore (IN); Lavan Kumar Peechara, Andhra Pradesh (IN); Vingesh Shetty, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 574 days.

(21) Appl. No.: 12/403,146

(22) Filed: Mar. 12, 2009

(65) Prior Publication Data

US 2010/0235603 A1  Sep. 16, 2010

(51) Int. Cl.
*G06F 12/00* (2006.01)

(52) U.S. Cl. ........ 711/170; 711/100; 711/103; 711/105; 711/154; 711/171; 707/736; 707/737; 707/802; 707/803; 707/809

(58) Field of Classification Search .................. 711/100, 711/103, 105, 111, 154, 170, 171; 707/205, 707/206, 736, 737, 802, 803, 809

See application file for complete search history.

(56) References Cited

U.S. PATENT DOCUMENTS

| | | | |
|---|---|---|---|
| 7,024,436 B2 * | 4/2006 | Kolodner et al. | 1/1 |
| 7,331,037 B2 * | 2/2008 | Dickey et al. | 717/106 |
| 7,685,396 B2 * | 3/2010 | Sze et al. | 711/170 |
| 7,827,375 B2 * | 11/2010 | Abrashkevich et al. | 711/170 |
| 2010/0235579 A1 * | 9/2010 | Biles et al. | 711/125 |

OTHER PUBLICATIONS

Avoiding—and fixing—memory fragmentation, lwn.net, dated Nov. 28, 2006.
Johnstone, Mark S., Wilson, Paul R., The Memory Fragmentation Problem: Solved?, grothoff.org, downloaded Jan. 8, 2009.
Clack, Chris, Smart Memory for Smart Phones, www.mm-net.org, downloaded Jan. 8, 2009.

* cited by examiner

*Primary Examiner* — Tuan Thai
*Assistant Examiner* — Zhuo Li
(74) *Attorney, Agent, or Firm* — Brinks Hofer Gilson & Lione

(57) ABSTRACT

In one embodiment, a memory manager may identify allocators as either transient in nature or static in nature based on a length of time each one of the allocators held, holds, or both, onto requested memory blocks. The memory manager may also allocate memory blocks requested by allocators identified as transient in nature from one memory pool and allocate memory blocks requested by allocators identified as static in nature from another memory pool. In one example, the memory manager may also use a deferred splitting strategy to optimize allocation of free memory next to memory blocks reserved by the most transient allocators by not splitting such free memory if the free bytes are less than a maximum block size threshold.

18 Claims, 3 Drawing Sheets

ADAPTIVE MEMORY ALLOCATION

TECHNICAL FIELD

The present disclosure relates generally to memory and, in particular, to memory management.

BACKGROUND

A goal of memory allocation algorithms may be to reduce or eliminate memory fragmentation. Memory fragmentation may result when free blocks are interleaved with reserved blocks.

One example of an allocation policy to limit memory fragmentation is a segregated free lists policy. A segregated free lists policy uses a set of free lists, where each free list identifies free blocks having sizes that fall within a determined range. When a memory block is requested, the free list corresponding to the size of the memory block is searched to find a free memory block of the appropriate size.

BRIEF DESCRIPTION OF THE DRAWINGS

The components and the figures are not necessarily to scale, emphasis instead being placed upon illustrating the principles of the invention. Moreover, in the figures, like-referenced numerals designate corresponding parts throughout the different views.

DESCRIPTION OF EXAMPLE EMBODIMENTS

Overview

Figure 1:
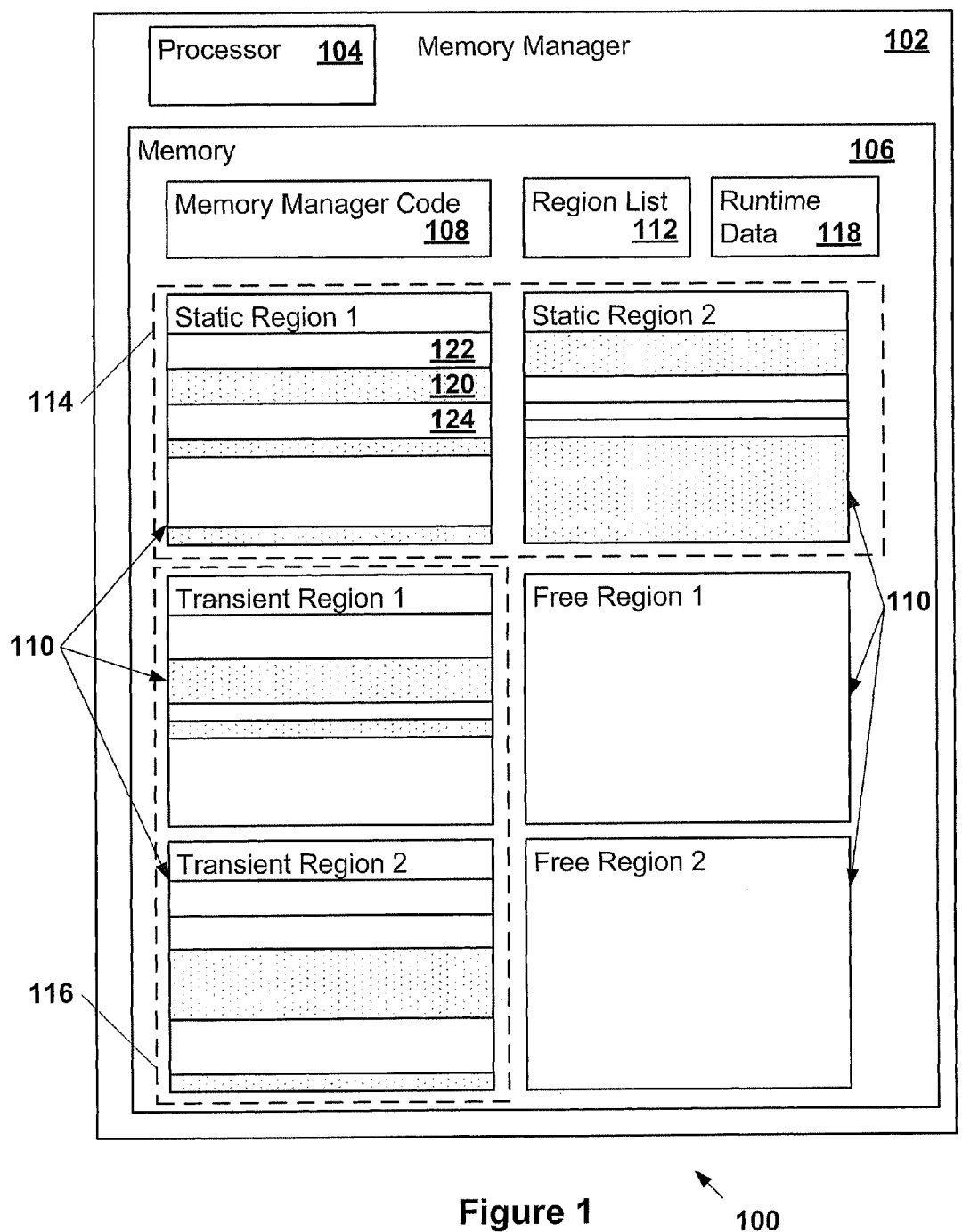
FIG. 1 illustrates an example of a system that uses an adaptive memory allocation strategy to limit memory fragmentation.

By way of introduction, the example embodiments described below include an apparatus, logic encoded in a computer readable media, and a method to limit memory fragmentation using a adaptive memory allocation strategy.

According to a first aspect, an apparatus may identify allocators as either transient or static based on a length of time each one of the allocators held, holds, or both onto requested memory blocks. The apparatus may also allocate memory blocks requested by allocators identified as transient from one memory pool and allocate memory blocks requested by allocators identified as static from another memory pool.

In a second aspect, logic encoded in a computer readable media, when executed, may determine a classification of an allocator based on a length of time of memory blocks requested by the allocator were allocated by the allocator. In response to a request by the allocator to allocate a memory block, the encoded logic, when executed, may select a memory pool from among multiple memory pools based on the classification of the allocator and then reserve the memory block in the selected memory pool.

In a third aspect, a method is provided. A classification of memory requesting programs may be identified by a processor based on a length of time each respective one of the memory requesting programs is determined to hold onto respective requested memory blocks. Memory blocks requested by the memory requesting programs identified as transient may be allocated by the processor from a first memory pool. Memory blocks requested by the memory requesting programs identified as static may be allocated by the processor from a second memory pool different than the first memory pool.

Example Embodiments

A root cause of memory fragmentation is that the free memory blocks are interleaved with reserved memory blocks that are held for a long time relative to other requested blocks. One example of an allocation strategy includes a system that allocates memory using a method of allocating memory based on predetermined behaviors perceived to be typical. Such an example fails to base memory allocation on runtime data and allocation and/or de-allocation patterns. Such an example may also not work efficiently in scenarios that deviate from patterns on which the system is based.

In one example embodiment, an allocation strategy may be based on runtime data collected during operation of the system. Memory blocks held for a long time relative to other requested memory blocks may be considered static memory blocks. Conversely, memory blocks held for a short time relative to other requested memory blocks may be considered transient memory blocks. In general, the memory blocks may be requested and used by allocators.

An allocator may be computer code that requests, and optionally releases, one or more blocks of memory through a programmatic call to memory manager code. One example allocator includes computer code written in the C programming language that calls the malloc( ) subroutine in the C standard library. Another example allocator includes computer code written in the Java programming language that instantiates an object. Each of the allocators may be identified, for example, by examining a program stack. The allocator may be any memory requesting program, such as a single code module, a single programmatic subroutine, or a computer instruction that includes a single call to a memory allocation subroutine. For example, one programmatic subroutine may request a block of memory having one size and another programmatic subroutine may request a block of memory having a second size. The first programmatic subroutine may hold onto the block of memory before releasing the block of memory for a longer period of time than the second programmatic subroutine holds onto the second block of memory.

The runtime data collected during operation of the system may be used to determine whether an allocator may be identified as having a static nature or a transient nature. The system may limit memory fragmentation by allocating static memory from a static memory pool and allocating transient memory from a transient memory pool. In this manner, the static memory blocks do not get interleaved with the transient memory blocks, which would leave "holes" of free memory between the static memory blocks.

If the allocator is identified as static in nature, memory requested by the allocator may be allocated from the static memory pool. Conversely, if the allocator is identified as transient in nature, memory requested by the allocator may be allocated from the transient memory pool. Each one of the allocators may be identified as static or transient based on (1) the length of time the allocator holds or previously held the memory blocks allocated for the allocator and, optionally, (2) the size of the memory blocks allocated for the allocator.

FIG. 1 illustrates an example of system 100 that includes a memory manager 102 that uses an adaptive memory allocation strategy to limit memory fragmentation. The system 100 may include additional components. The memory manager 102 may include a processor 104 and a memory 106. In different examples, the memory manager 102 may include more or different components.

The memory 106 may be any now known, or later discovered, data storage device. The memory 106 may be a non-volatile and/or volatile memory, such as a random access memory (RAM), a read-only memory (ROM), an erasable programmable read-only memory (EPROM), a flash memory or any combination thereof. The memory 106 may include an optical, magnetic (hard-drive) or any other form of data storage device.

The processor 104 may be in communication with the memory 106. The processor 104 may also be in communication with additional components, such as a display. The processor 104 may be a general processor, central processing unit, computer, server, application specific integrated circuit (ASIC), digital signal processor, field programmable gate array (FPGA), digital circuit, analog circuit, or combinations thereof. The processor 104 may be one or more devices operable to execute computer executable instructions or computer code embodied in the memory 104 or other memory to use an adaptive memory allocation strategy.

The memory 106 or another memory may include computer code, such as the memory manager code 108. The computer code may also include program code that includes the allocators that invoke the memory manager code 108 to allocate and/or release memory. The computer code may include instructions executable with the processor 104. The computer code may include embedded logic. For example, the memory manager code 108, when executed by the processor 104, may implement the memory management functionality. The computer code may be written in any computer language now known or later discovered, such as C++, C#, Java, Pascal, Visual Basic, Perl, HyperText Markup Language (HTML), JavaScript, assembly language, and any combination thereof.

During operation, the memory manager 102 may initially divide the memory 106 into regions 110 of a fixed size in one example. In a second example, the regions 110 may differ in size. The fixed size may be configurable. In one example, the fixed size may be configured to be greater than the largest allocation size request to be issued in the system. In another example, one or more of the regions 110 may be resized to accommodate a request to allocate a memory block larger than the regions 110.

The memory manager 102 may track information on each of the regions 110 in a regions list 112. Initially, one of the regions 110 may be identified in the regions list 112 as part of a static memory pool 114, such as Static Region 1 in FIG. 1. Each of the other regions 110 may be identified in the regions list 112 as a free region. A free region may be any region that may be assigned to the static memory pool or a transient memory pool 116, but is assigned to neither. In other examples, the memory manager 102 may assign the regions 110 differently. The static memory pool 114 and the transient memory pool 116 are two distinct memory areas. Blocks of memory in either one of the memory areas may or may not be contiguous. Static memory may be allocated from the static memory pool 114, and transient memory may be allocated from the transient memory pool 116. In other embodiments, the static and transient memory pools 114, 116 are assigned without reservation of the free regions.

During an initial time period, the memory manager 102 may allocate memory from the static memory pool 114 in response to memory allocation requests from allocators. In one example, the initial time period may expire when the first region of the static memory pool 114 is full. In a second example, the initial time period may expire when a configurable number of regions 110 assigned to the static memory pool 114 are full. In a third example, the initial time period may expire after a configurable length of time has elapsed since the startup of the system 100.

After the initial time period, the memory manager 102 may assign one or more of the regions 110 that is a free region to the transient memory pool 116. As either of the static memory pool 114 or the transient memory pool 116 becomes full, the memory manager 102 may assign an additional one of the regions 110 that is a free region to the full memory pool.

During and after the initial time period, the memory manager 102 may track runtime data 118 related to, for example, allocations and/or de-allocations. Memory blocks may be allocated from the static memory pool 114 during the initial time period due to an initial lack of runtime data 118. With sufficient runtime data 118, the memory manager 102 may identify each respective one of the allocators as either transient in nature or static in nature based on a length of time each respective one of the allocators held requested memory blocks. Additionally, the memory manager 102 may identify each respective one of the allocators as either transient in nature or static in nature also based on the size of the blocks requested. In other embodiments, rather than using the initial time period to collect data on usage, the allocators are initially assigned as transient or static based on predetermined settings, expected usage, and/or the type of program being implemented. Later actual usage is then used when available.

Whether the allocator is transient in nature or static in nature indicates whether allocation requests from the allocator should take memory from the transient memory pool 116 or from the static memory pool 114. For example, the memory manager 102 may calculate a static factor for each respective one of the allocators. The static factor may indicate whether the allocator is either transient in nature or static in nature.

In one example, the static factor may be calculated during a de-allocation request issued by the allocator as:

$$\text{static factor}=\text{average hold time}+1/(\text{average block size})$$

where the average hold time is the average time the allocator holds a memory block before releasing the memory block, and where the average block size is the average size of the memory blocks requested by the allocator. The average hold time and the average block size may be calculated as a running average. The higher the static value, the more suitable subsequent memory allocations requested by the allocator may be for the static memory pool 114. A larger memory block may cause less fragmentation than a smaller memory block even if held for the same amount of time because the larger memory block is a contiguous block.

The memory manager 102 may identify the allocator as static in nature if the associated static factor in the runtime data 118 is above a determined threshold value. Alternatively or in addition, the memory manager 102 may identify the allocator as transient in nature if the associated static factor in the runtime data 118 is below the determined threshold value.

In a different example, the memory manager 102 may calculate the static factor using a different formula. For example the inverse of the average block size may be multiplied by a weighting factor to emphasize or deemphasize the size of memory requested versus the time the requested memory was held. As another example, the time may be used without consideration of size. Other factors may be used in the calculation, such as frequency of allocation and/or de-allocation by a given allocator.

The memory manager 102 may update the runtime data 102 upon each allocation and/or de-allocation request received. For example, when the allocator requests that a memory block be de-allocated, the memory manager 102 may determine a length of time the memory block was held. The memory manager 102 may calculate the average hold time by adding the length of time the memory block was held to the average hold time of past allocations issued by the allocator and dividing the sum by a total number of allocation requests issued by the allocator. The memory manager 102 may update the average hold time and the total number of allocation requests in the runtime data 118. The memory manager 102 may calculate the average block size as a running average and update the average block size associated with the allocator in the runtime data 118. In one example, the average hold time is determined in milliseconds and the average block size is determined in bytes. In different examples, different units, non-average values, or other functions may be used.

Allocators that first request memory blocks after the initial time period has elapsed may have no associated information in the runtime data 118. The memory manager 102 may initially allocate memory from the static memory pool 114 in response to allocation requests from such allocators. After a determined number of allocation requests from one such allocator or after a determined period of time, the memory manager 102 may determine whether that allocator is static or transient in nature. After the nature of allocator is appropriately identified, the memory manager 102 may service a subsequent memory request from the appropriate memory pool.

In one example, all reserved memory blocks not yet released are not part of the calculation of the static factor because the hold times of the unreleased blocks are still unknown. In a different example, an average hold time of an allocator may also be based on hold times of reserved memory blocks not yet released by calculating the hold times of the unreleased memory blocks as the time elapsed since the unreleased memory blocks were allocated.

The memory manager 102 may periodically calculate the average static factor of the allocators in the system 100. The determined threshold value used to determine the nature of the allocators may be based on the average static factor. For example, the determined threshold value may be the average static factor. In another example, the determined threshold value may be a configurable percentage of the average static factor. Consequently, the memory manager 102 may periodically re-identify each respective one of the allocators as transient or static in nature. In still another example, the determined threshold value may be configurable without a dependence on the average static factor.

Different applications may have different optimal determined threshold values. For example, a web server may issue more static allocations than a router.

In one example, instead of using the static factor to determine the nature of the allocators, the memory manager 102 may use a transient factor. For example, the transient factor may be calculated as the multiplicative inverse of the average hold time plus the average block size.

In one example, the memory manager 102 may additionally use a deferred splitting strategy to further tune allocations of memory in the transient memory pool 116 based on the runtime data 118. The deferred splitting strategy may optimize allocation of free memory adjacent to a memory block reserved by one or more of the most transient allocators by not splitting such free memory if the free bytes are less than a maximum block size threshold. Splitting free memory refers to making free bytes 120 between two reserved memory blocks 122 and 124 available to subsequent allocation requests. The deferred splitting strategy may prevent unnecessarily making memory blocks in the transient memory pool 116 smaller. Accordingly, the deferred splitting strategy may, in some examples, lead to improved performance. For example, if the maximum block size threshold is the range of 100 to 200 bytes and a request for a block of size of 400 bytes is to be allocated from a free block of 480 bytes, the remaining 80 bytes are not made available for further allocation requests because the remaining 80 bytes in the block is less than 100, the lower end of the range. Other allocation processes may be used within each and/or separately for each of the static and transient memory blocks 114, 116.

To determine the maximum block size threshold, the memory manager 102 may store a range allocation count associated with each respective one of multiple block size ranges in the runtime data 118. The range allocation count may be a count of the number of allocation requests per block size range. The block size ranges may correspond to the ranges used in implementing, for example, the segregated free lists policy. When the memory manager 102 receives one of the allocation requests, the memory manager 102 may increment a range allocation count corresponding to the block size range in which the size of the requested block size belongs. For example, where one of the block size ranges is from 100 bytes to 200 bytes and one of the allocators requests 150 bytes of memory, the memory manager 102 may increment the range allocation count corresponding to the block size range from 100 bytes to 200 bytes. The range allocation counts corresponding to the block size ranges are independent of which allocators issued the memory allocation requests.

In one example, the memory manager 102 may determine the maximum block size threshold as the largest block size in the block size range most frequently allocated. The block size range most frequently allocated may be the block size range having the maximum corresponding range allocation count. Alternatively or additionally, the maximum block size threshold may be configurable. The maximum block size threshold may be included in the runtime data 118.

The memory manager 102 may determine the most transient allocators as the allocators having the lowest associated static factors. For example, the most transient allocators may be a configurable percentage of the allocators having the lowest associated static factors. Alternatively or additionally, the most transient allocators may be allocators having a static factor lower than a configurable threshold. The most transient allocators and/or the configurable threshold may be included in the runtime data 118.

Having determined the maximum block size threshold and having identified the most transient allocators, the memory manager 102 may use the deferred splitting strategy. The memory manager 102 may split free bytes 120 between two reserved memory blocks 122 and 124 where one or more of the two reserved memory blocks 122 and 124 is reserved by one of the most transient allocators if the free bytes 120 are greater than the maximum block size threshold.

Figure 2:
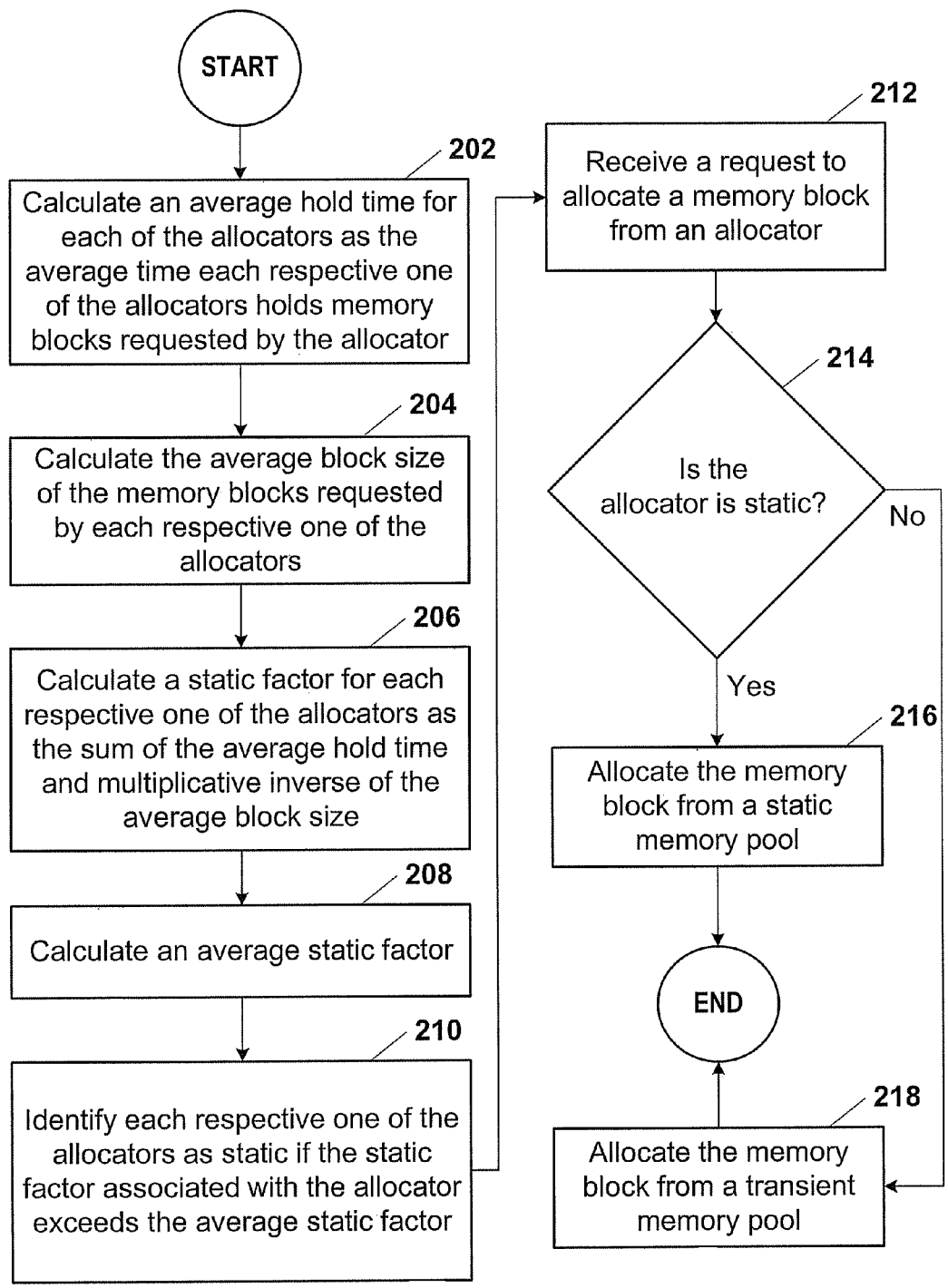
FIG. 2 illustrates a first embodiment of a method to limit memory fragmentation using an adaptive memory allocation strategy.

FIG. 2 illustrates a first embodiment of a method to limit memory fragmentation. Additional, different, or fewer acts may be performed. The acts may be performed in a different order than illustrated in FIG. 2.

In act 202 of the embodiment illustrated in FIG. 2, the operation may begin by calculating the average hold time for each of the allocators as the average time each respective one of the allocators held requested memory blocks. Calculating the average hold time for each respective one of the allocators may be performed whenever each respective one of the allocators de-allocates one of the requested memory blocks. Alternatively, the hold time is calculated based, at least in part, on how long currently held and as yet unreleased memory blocks have been allocated.

The operation may continue in act 204 by, for each of the allocators, calculating the average block size of the memory blocks requested by each respective one of the allocators. Calculating the average block size may be performed individually whenever each respective one of the allocators allocates one of the requested memory blocks. In other examples, the operation may skip act 204 of calculating the average block size.

In act 206, the operation may include calculating the static factor for each respective one of the allocators as the sum of the average hold time and the multiplicative inverse of the average block size. In different examples, the operation may include calculating the static factor using a different formula. In still other examples, the operation may include calculating a transient factor instead of the static factor. In one example, calculating the static factor for each respective one of the allocators may be performed periodically. In a second example, calculating the static factor for each respective one of the allocators may be performed individually for each respective one of the allocators when each respective one of the allocators requests allocation and/or de-allocation of a memory block.

The operation may, in act 208, include calculating the average, mean, or other statistic of the static factor for the allocators. Calculating the average static factor for the allocators may be performed periodically.

The operation may, in act 210, include identifying each respective one of the allocators as static in nature if the static factor associated with the allocator exceeds some percentage (e.g., 100%) of the average or other statistical static factor. In a different example than the embodiment illustrated in FIG. 2, the operation may instead include identifying each respective one of the allocators as static in nature if the static factor exceeds a predetermined, user set, or otherwise configured threshold value. The operation may include an additional act of periodically re-identifying each respective one of the allocators as either static or transient in nature.

The operation may, in act 212, continue by receiving a request to allocate a memory block from one of the allocators. The operation may, in act 214, continue in response by determining whether the allocator is static in nature. If the allocator is static in nature, the operation may continue in act 216 by allocating the memory block from the static memory pool 114. Conversely, if the allocator is not static in nature, the operation may continue in act 218 by allocating the memory block from the transient memory pool 116.

The system 100 may be a closed-loop system because the allocation strategy may be based on runtime data 118 collected in the system 100. Alternatively, the system 100 may be an open-loop system by, for example, including static and transient identifiers in code. The system 100 may be adaptive because the memory manager may alter the allocation behavior based on the runtime data 118 collected over time.

A primary cause of memory fragmentation may be a relatively high number of holes created between memory blocks that are rarely freed, preventing the coalescing of the holes into larger blocks of free memory. Localizing allocations of static and transient memory blocks to different memory pools may help to limit such a scenario. Additionally, the deferred splitting strategy may help to keep the holes in the transient memory pool 116 larger than the holes would otherwise be.

By periodically updating the runtime data 118, the memory manager 102 may better handle a case where the nature of one or more allocator changes over time. Also, the memory manager 102 may dynamically learn the maximum block size threshold used in the deferred splitting strategy thereby further tuning transient allocations.

Figure 3:
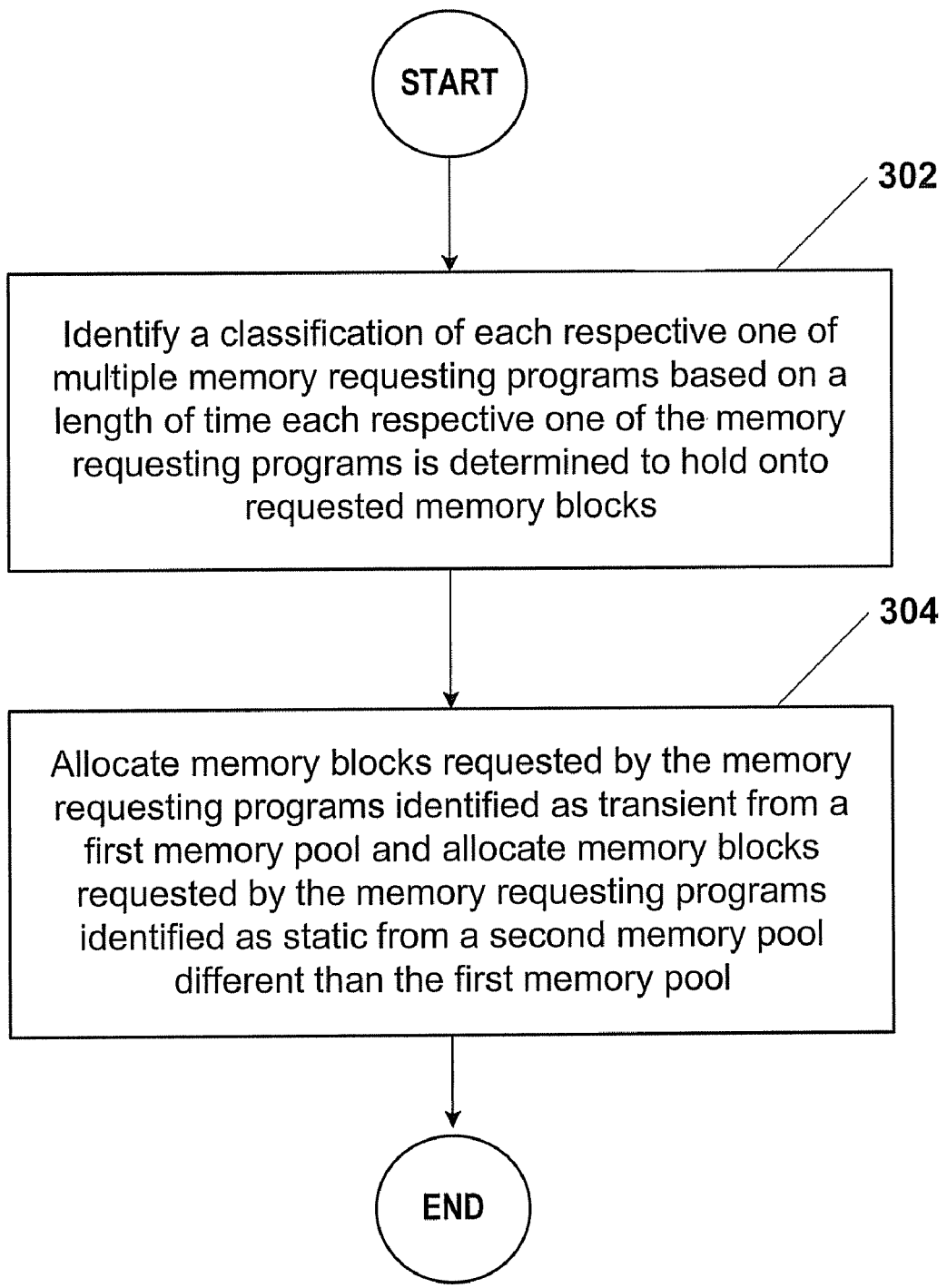
FIG. 3 illustrates a second embodiment of a method to limit memory fragmentation using an adaptive memory allocation strategy.

FIG. 3 illustrates a second embodiment of a method to limit memory fragmentation. Additional, different, or fewer acts may be performed. The acts may be performed in a different order than illustrated in FIG. 3.

The operation may begin in act 302 by identifying a nature of each respective memory requesting programs based on a length of time each respective one of the memory requesting programs held, holds, or both onto requested memory blocks.

The operation may complete in act 304 by allocating memory blocks requested by the memory requesting programs identified as transient in nature from a first memory pool and allocating memory blocks requested by the memory requesting programs identified as static in nature from a second memory pool, which is different than the first memory pool.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

To clarify the use in the pending claims and to hereby provide notice to the public, the phrase "either <A> or <B>" is defined by the Applicant, superseding any other implied definitions herebefore or hereinafter unless expressly asserted by the Applicant to the contrary, to mean either A or B, but not both A and B.

What is claimed is:

1. An apparatus comprising:
a memory; and
a processor in communication with the memory, the memory including computer code executable with the processor, wherein the computer code is configured to:
calculate a static factor for each respective one of a plurality of allocators based on a length of time each respective one of the allocators held onto a respective plurality of requested memory blocks;
identify each respective one of the allocators as either transient or static based on the length of time each respective one of the allocators is determined to hold onto the respective requested memory blocks, wherein the computer code configured to identify each respective one of the allocators as either transient or static is further configured to identify each respective one of the allocators as either transient or static based on the static factor of each respective one of the allocators; and
allocate at least one first memory block requested by the allocators identified as transient from a first memory pool and allocate at least one second memory block requested by the allocators identified as static from a second memory pool, the second memory pool different from the first memory pool.

2. The apparatus of claim 1, wherein the computer code configured to identify each respective one of the allocators is further configured to identify each respective one of the allocators as either transient or static based also on sizes of the respective requested memory blocks.

3. The apparatus of claim 1, wherein the computer code configured to calculate the static factor for each respective one of the allocators is further configured to calculate the static factor for each respective one of the allocators as a summation of an average length of time the respective one of the allocators held the respective requested memory blocks and the multiplicative inverse of an average size of the respective requested memory blocks.

4. The apparatus of claim 1, wherein the computer code is further configured to periodically recalculate the static factor for each respective one of the allocators and to periodically re-identify each respective one of the allocators as either transient or static based on the static factor for each respective one of the allocators.

5. The apparatus of claim 1, wherein the computer code configured to identify each respective one of the allocators is further configured to identify each respective one of the allocators as either transient or static based on a comparison of the static factor of each respective one of the allocators with a threshold value.

6. The apparatus of claim 5, wherein the threshold value is an average static factor.

7. Logic encoded in one or more tangible media for execution with a processor and when executed operable to:
determine whether an allocator is static or transient based on a length of time a plurality of memory blocks requested by the allocator are allocated by the allocator, wherein the logic to determine whether the allocator is static or transient includes logic to determine whether the allocator is static or transient based on a static factor associated with the allocator, wherein the static factor is calculated based on the length of time the memory blocks requested by the allocator are held by the allocator; and
in response to a request by the allocator to allocate a memory block, select a memory pool from among a plurality of memory pools based on whether the allocator is static or transient and reserve the memory block in the memory pool.

8. The one or more tangible media of claim 7, wherein the logic to determine whether the allocator is static or transient includes logic to determine whether the allocator is static or transient based on an average size of the memory blocks.

9. The one or more tangible media of claim 7, wherein the length of time the memory blocks requested by the allocator are allocated by the allocator is determined based on the length of time the memory blocks requested by the allocator were held before released.

10. The one or more tangible media of claim 7, wherein the static factor is calculated based on an average time the memory blocks are held by the allocator and on an average block size of the memory blocks.

11. The one or more tangible media of claim 7, wherein the logic to determine whether the allocator is static or transient includes logic to determine whether the allocator is static or transient based on a comparison of the static factor with an average of a plurality of static factors associated with a plurality of allocators and wherein the static factor is based on the length of time the memory blocks requested by the allocator were held by the allocator.

12. The one or more tangible media of claim 11, wherein the encoded logic when executed is further operable to prevent allocation of a plurality of free bytes adjacent to the memory block held by the allocator in response to the free bytes determined to be less than a maximum block size threshold and the static factor determined to be less than a threshold value.

13. A method comprising:
calculating a static factor with a processor for each respective one of a plurality of memory requesting programs based on a length of time each respective one of the memory requesting programs held onto a respective plurality of requested memory blocks:
identifying, by the processor, a classification of each respective one of the memory requesting programs based on a length of time each respective one of the memory requesting programs is determined to hold onto the respective requested memory blocks, wherein identifying the classification of each respective one of the memory requesting programs includes identifying the classification of each respective one of the memory requesting programs based on the static factor of each respective one of the memory requesting programs; and
allocating, by the processor, at least one first memory block requested by the memory requesting programs identified as transient from a first memory pool and allocating at least one second memory block requested by the memory requesting programs identified as static from a second memory pool different than the first memory pool.

14. The method of claim 13, further comprising periodically recalculating the static factor for each respective one of the memory requesting programs and periodically re-identifying the classification of each respective one of the memory requesting programs.

15. The method of claim 13, further comprising preventing an allocation of a free memory block in the first memory pool in response to both determining the free memory block is less than a maximum block size threshold and determining the free memory block is adjacent to at least one memory block held by one of the memory requesting programs having an associated static factor below a determined threshold.

16. The method of claim 15, further comprising determining the maximum block size threshold as a maximum block size in a block size range most frequently requested by the memory requesting programs.

17. The method of claim 15, further comprising determining the determined threshold as a lowest determined percentage of static factors associated with memory requesting programs.

18. The method of claim 13, wherein determining the static factor for each respective one of the memory requesting programs is based on the length of time each respective one of the memory requesting programs held onto the respective requested memory blocks and on an average block size of the respective requested memory blocks.

* * * * *